UNITED STATES PATENT OFFICE.

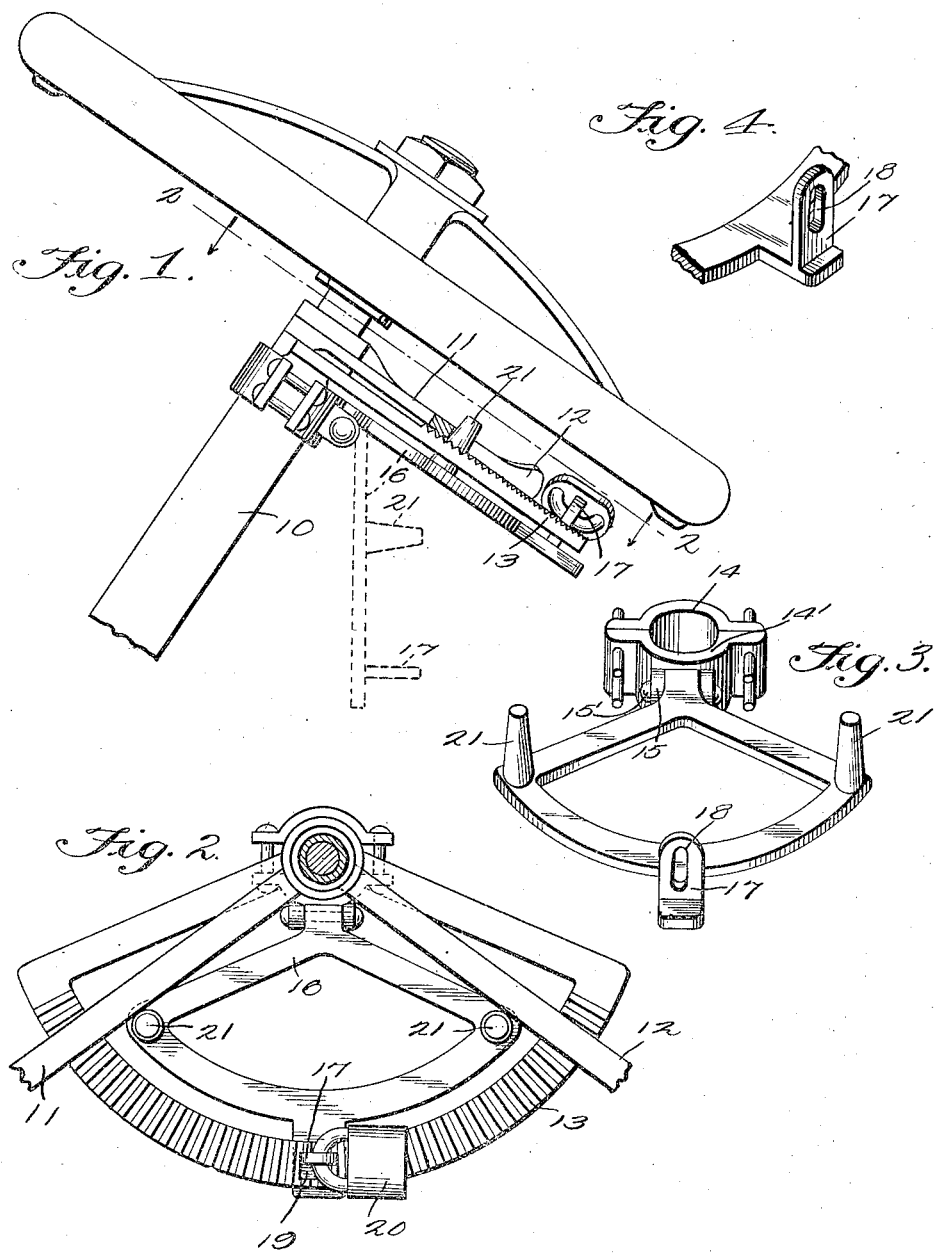

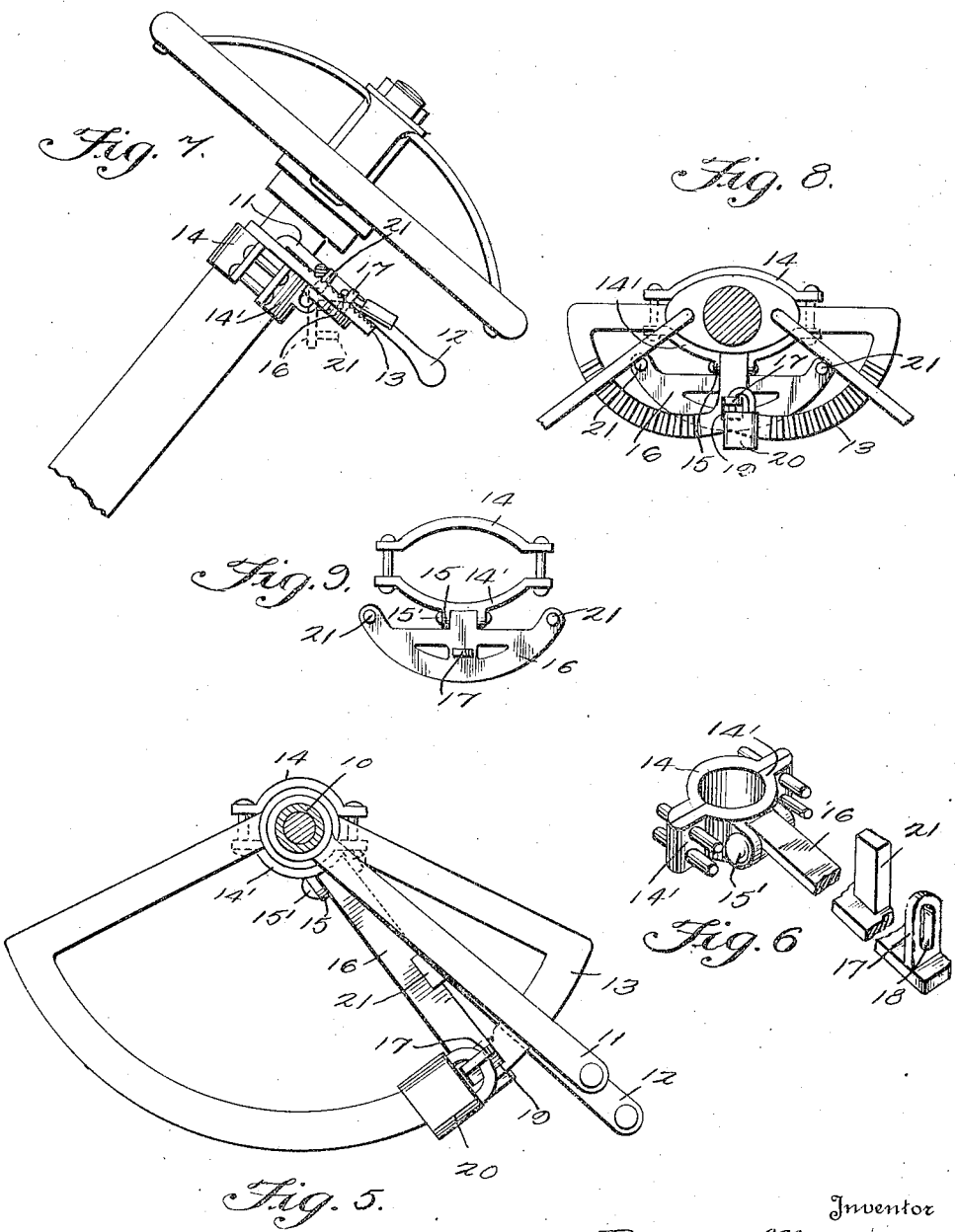

DAVID MORRIS AND WILLIAM LEVY, OF PATERSON, NEW JERSEY; SAID MORRIS ASSIGNOR TO SAID LEVY.

CONTROL-LEVER LOCK FOR AUTOMOBILES.

1,346,762.          Specification of Letters Patent.          Patented July 13, 1920.

Application filed February 26, 1920. Serial No. 361,490.

*To all whom it may concern:*

Be it known that we, DAVID MORRIS and WILLIAM LEVY, citizens of the United States, residing at Paterson, in the county of Passaic and State of New Jersey, have invented certain new and useful Improvements in Control-Lever Locks for Automobiles, of which the following is a specification.

This invention relates to control lever locks for automobiles.

An important object of the invention is to provide a device for locking the levers which control the operation of the engine of an automobile in such position that the engine can not be started.

A further object is to provide a device of this character which is extremely simple in construction and cheap to manufacture and which may be readily attached to the vehicle.

Other objects and advantages will become apparent throughout the course of the following description.

In the accompanying drawings in which for the purpose of illustration are shown preferred embodiments of our invention and wherein like numerals designate like parts throughout, Figure 1 is a side elevation of the steering post casing and steering wheel of an automobile showing our invention applied thereto.

Fig. 2 is a section taken on the line 2—2 of Fig. 1.

Fig. 3 is a perspective of our locking plate detached.

Fig. 4 is a detailed perspective of the portion of the locking plate which receives the shackle of the padlock.

Fig. 5 is a plan view showing our invention applied to a control mechanism wherein the levers are both shifted in the same direction on the segment.

Fig. 6 is a perspective of this form of locking plate detached.

Fig. 7 is a side elevation similar to that shown in Fig. 1 illustrating the locking plate attached to a slightly different form of control mechanism.

Fig. 8 is a plan view of the locking plate attached as shown in Fig. 7.

Fig. 9 is a plan view of this form of locking plate detached.

Referring now more particularly to the drawings the numeral 10 indicates a steering post casing of an automobile in which are pivotally mounted engine control rods (not shown) terminating at their upper ends in control levers 11 and 12. These levers operate upon a segment 13 secured to the steering post casing and are provided with notches with which the levers coöperate for adjustment. The usual steering post (not shown) is rotatably arranged within the steering post casing.

A yoke is provided formed of sections 14 and 14' which are secured about the steering post casing 10 in any suitable manner as for example by means of rivets. The yoke 14, is provided with ears 15 to which a plate 16 is pivotally connected. This plate 16 is provided at its outer end with an upstanding portion 17 having an opening 18 formed therein. When in its raised position the upstanding portion 17 of the plate 16 extends through an opening 19 formed in the segment 13, the shackle of the padlock 20 being passed through the opening 18 thereof.

Where the engine operating levers of the automobile operate in opposite directions upon the segment, to advance the spark and open the throttle, the plate 16 is provided with a pair of upstanding lugs 21, these lugs being so spaced as to hold the levers 11 and 12 in a position at which the engine of the automobile may not be started. Where the levers both move in the same direction upon the segment 13 but a single lug 21 is necessary. This lug being of sufficient length to engage both levers and prement movement thereof.

In the use of our device the levers 11 and 12 are shifted to the cutoff position and the plate 16 elevated so that the portion 17 thereof projects through the opening 19 formed in the segment, and the lock 20 is placed in position. It will be obvious that the lugs or lug, as the case may be, of the plate 16 engaging the levers will hold the levers in such cut off position and prevent starting of the engine.

As many changes are possible in the shape, size and arrangement, of the various parts herein shown, we do not limit ourselves to the particular construction herein set forth, but may make any such changes without departing from the spirit of the invention, or the scope of the subjoined claims.

What we claim is:

1. In an engine control lever lock for automobiles, the combination with the usual steering post casing bearing the control levers and a segment upon which said control levers may be adjusted to positions at which the engine of the automobile is operative and inoperative, said segment being provided with an opening, a plate pivotally secured to said steering post casing and adapted to be shifted to raised and lowered positions, an upstanding portion on said plate adapted to extend through the opening formed in said segment, said upstanding portion being provided with an opening adapted to receive the shackle of a lock, and means carried by said plate and adapted to engage the control levers when in said inoperative position and prevent the shifting thereof to the operative position.

2. In an engine control lever lock for automobiles, the combination with the usual steering post casing bearing the control levers and a segment upon which said control levers may be adjusted to positions at which the engine of the automobile is operative and inoperative, said segment being provided with an opening, a plate pivotally secured to said steering post casing and adapted to be shifted to raised and lowered positions, an upstanding portion on said plate adaped to extend through the opening formed in said segment, said upstanding portion being provided with an opening adapted to receive the shackle of a lock, and means carried by said plate and adapted to engage the control levers when in said inoperative position and prevent the shifting thereof to the operative position, said means comprising lugs carried by said plate and extending upwardly therefrom into the path of movement of said control levers.

In testimony whereof we affix our signatures in presence of two witnesses.

DAVID MORRIS.
WILLIAM LEVY.

Witnesses:
LEONARD LITTLE,
HOWARD L. BRISTOW.